US011869463B1

(12) United States Patent
Lazaroff

(10) Patent No.: US 11,869,463 B1
(45) Date of Patent: Jan. 9, 2024

(54) BAGPIPE ADAPTIVE AIR SUPPLY

(71) Applicant: Bruce Lazaroff, Middletown, DE (US)

(72) Inventor: Bruce Lazaroff, Middletown, DE (US)

( * ) Notice: Subject to any disclaimer, the term of this patent is extended or adjusted under 35 U.S.C. 154(b) by 0 days.

(21) Appl. No.: 17/837,581

(22) Filed: Jun. 10, 2022

Related U.S. Application Data

(60) Provisional application No. 63/211,688, filed on Jun. 17, 2021.

(51) Int. Cl.
*G10D 7/063* (2020.01)

(52) U.S. Cl.
CPC .................................... *G10D 7/063* (2013.01)

(58) Field of Classification Search
CPC ...................................................... G10D 7/063
See application file for complete search history.

(56) References Cited

U.S. PATENT DOCUMENTS 2,233,507 A * 3/1941 Adamson ............... G10D 7/063 984/132
2,737,074 A * 3/1956 Magnus ................. G10D 7/063 84/375
3,476,006 A * 11/1969 Wright ................... G10D 7/063
3,756,112 A * 9/1973 Adams ................... G10D 7/063 984/132
4,655,693 A * 4/1987 Grime ..................... F04B 49/20 474/26
6,031,168 A * 2/2000 Damm ................... G10D 7/063 84/465
7,615,699 B1 * 11/2009 McNulty ................ G10D 7/063 84/380 B
9,117,422 B2 * 8/2015 Kinnaird ................ G10D 9/035
2020/0327873 A1 * 10/2020 Duncan ..................... G10H 3/16
2022/0255489 A1 * 8/2022 Chretien ............... H02P 29/024

FOREIGN PATENT DOCUMENTS

GB 1415927 A * 12/1975 ............. G10D 7/063
GB 2401474 A * 11/2004 ............. G10D 7/063

OTHER PUBLICATIONS

Smith Youtube, https://www.youtube.com/watch?v=qnj1KGBRBcA posted Sep. 26, 2009. (Year: 2009).*

* cited by examiner

*Primary Examiner* — Robert W Horn
(74) *Attorney, Agent, or Firm* — Robert J. Yarbrough of Lipton, Weinberger & Husick

(57) ABSTRACT

A lightweight, portable and adaptive air supply for a bagpipe, such as a Great Highland Bagpipe, may include a variable speed compressor and an air supply line communicating from the compressor to the bag of the bagpipe. A switch, which may be a mouth-operated switch, allows the piper to control the air compressor when the piper is playing the bagpipe. The adaptive air supply allows a person to play the bagpipe who may have physical challenges preventing the person from producing breath having the quantity and air pressure otherwise required. The adaptive air supply also allows ready setup of a bagpipe and is a useful teaching tool.

9 Claims, 11 Drawing Sheets prior art

BAGPIPE ADAPTIVE AIR SUPPLY

I. BACKGROUND OF THE INVENTION

A. Field of the Invention

The Invention relates to mouth-blown or bellows-blown bagpipes of any type and particularly to Great Highland Bagpipes. The adaptive air supply of the Invention provides air to inflate the bagpipe bag for a person who may have physical challenges preventing the person from producing breath or operating bellows to produce the quantity and pressure of air otherwise required. The adaptive air supply also allows ready setup of a bagpipe.

B. Statement of the Related Art

The Great Highland Bagpipe is associated with Scotland and is popular with pipe bands throughout the world. The Great Highland Bagpipe includes a chanter and three drones. Air is supplied to the chanter and drones from an air-filled bladder, or bag. The piper holds the bag under the piper's arm and compresses the bag between his or her arm and body to control the air pressure supplied to the chanter and drones. The piper supplies air to the bag by a blowpipe from his or her mouth. The piper must overcome the air pressure within the bag to deliver air to the bag, which requires considerable abdominal strength and an un-compromised airway on the part of the piper. During play, the piper controls the musical pitch produce by the chanter by covering or uncovering tone holes in the chanter, thereby shortening or lengthening the vibrating air column within the chanter.

The three drones each has a reed comprising a single vibrating tongue to generate sound. Air is also supplied to the drone reeds from the bag under pressure. The drones are tuned in octaves and sound simultaneously with the chanter. The piper may adjust the pitch produced by the drones during setup of the instrument, but does not change the pitch of the drones during play.

Regulation of the pressure and hence volume of the air passing through the four reeds of the Great Highland pipes can be challenging for the piper because the chanter and drones will sound together and with good tone and in tune only in a narrow range of air pressures, even when properly set up. The usable range of air pressures varies from one bagpipe to another, from one piper to another, and from one setup to another. The piper must be able to produce air of adequate pressure and volume using his or her breath. For a piper having physical limitations, the production of air of adequate pressure and volume using the piper's breath may not be possible.

While this document describes the adaptive air supply of the Invention relating Great Highland Bagpipes, the Invention is equally applicable to and usable with any mouth-blown or bellows-blown bagpipe, including Scottish small-pipes, Border pipes, Zetland pipes, Uilleann pipes, Great Irish Warpipes, Brian Boru pipes, Pastoral pipes, English bagpipes, Northumbrian smallpipes, German bagpipes, and any other of the dozens of bagpipe types known around the world. The common features of all of the prior art bagpipes are a bag, a chanter connected to the bag and producing sound due to a vibrating reed(s), and a source of air to fill the bag. The source of the air is either the breath of the piper for mouth-blown bagpipes or an arm-operated bellows for bellows-blown bagpipes. For all of the prior art bagpipes, the piper controls the air pressure supplied to the chanter and to any drones by compressing the bag using the piper's body.

The prior art does not teach the adaptive air supply of the Invention.

II. BRIEF SUMMARY OF THE INVENTION

The Invention is an apparatus and method for providing air under pressure to the bag of a bagpipe such as a Great Highland Bagpipe sufficient to inflate the bag and to cause the chanter reed and drone reeds to sound, all while allowing the piper adequate control to play with good tone and in tune. As used in this document, the term 'Great Highland Bagpipe' also means any bagpipe of any type. The air supply apparatus may be battery-powered and self-contained, so that a piper may march while playing, as in a parade, and so that the piper may move about while playing, as on a stage.

The air supply system comprises an electrical power supply, a compressor operated by the power supply, and an air supply line to convey the compressed air to the bag. The power supply may be a replaceable battery, such as a lithium ion battery. The air compressor may be a positive displacement compressor, such as a reciprocating, rotary, lobe, screw, liquid ring, scroll or vane compressor. The air compressor may be a dynamic compressor, such as a centrifugal or axial compressor.

The compressor may be powered by an electric motor. The speed of rotation of the electric motor may be variable under the control of an electronic speed controller. The electronic speed controller may be user-adjustable by the piper, as by a speed control signal from a variable speed actuator. Alternatively, the speed of rotation of the motor may be controlled manually by a potentiometer controlling the voltage applied to the electric motor. As another alternative, the speed of rotation of the electric motor and compressor may be fixed.

The power supply and compressor may be joined as a single unit and the combination of the compressor and power supply may be worn on the body of the player, as by being suspended from a shoulder strap, a belt or a backpack. The air supply line is a tube that may be attachable to the compressor and to the bag.

The air compressor may be switchable by the piper, for example, to switch off the compressor when the piper is not playing. The ability to switch the compressor off and on allows the piper to avoid undesirable sounds while performing, to extend battery life, and to reduce excess heat. Activation of the compressor may be by a manual switch under the control of the piper. As used in this document a 'manual' switch is a switch that is actuated by a touch or other physical action by the piper, such as a touch switch or a puff switch, as described below. While the manual switch may physically connect or interrupt electrical power to the compressor motor by a wired connection, the manual switch alternatively may generate an electronic signal, such as a radio signal, that instructs an electronic motor controller to connect or shut off electrical power to the motor.

The location of the switch is important for seamless playing by the piper. In a first embodiment, the switch is a puff switch actuated by a mouthpiece corresponding to the blowpipe of a prior art Great Highland Bagpipe. The function of the blowpipe in a prior art mouth-operated bagpipe is to fill the bag with the piper's breath. The blowpipe does not serve that function in the system of the Invention and a mouthpiece is not in fluid communication with the bag. Instead, a puff switch may be located in fluid communication with a mouthpiece. When the piper compresses the air within the mouthpiece using the piper's breath or by compressing air within the piper's mouth, the puff switch is activated. The activated puff switch energizes the compressor. The puff switch may be either momentary or may be a latching switch. The momentary switch actuates the compressor only while the piper maintains air pressure on the mouthpiece, which may not be feasible for a piper with physical challenges. The switch may be a latching switch, with one puff on the blowpipe actuating the switch and hence starting the motor and compressor and a second puff de-actuating the switch and hence stopping the motor and compressor.

As an alternative to a pressure-operated puff switch, the switch may be a bite switch in which a bulb is disposed at the end of the blowpipe and is held in the piper's mouth. The piper bites the bulb to activate the switch and bites the bulb a second time to de-activate the switch. As another alternative, the switch may be a vacuum-operated sip switch. The piper creates a partial vacuum in the mouthpiece using his or her mouth to actuate or de-actuate the switch. The switch may be a combination puff and sip switch in which the switch is actuated by either a sip or a puff. As used hereinafter, a 'puff switch' means a puff switch, a bite switch, a sip switch, or a puff and sip switch.

The mouthpiece and the puff switch may be elongated to resemble the prior art blowpipe and may be disposed along a mouthpiece longitudinal axis that is coextensive with the blowpipe stock longitudinal axis. To an observer, the combination of the puff switch and the mouthpiece appears to be a prior art blowpipe.

A second embodiment of a manual switch to control the compressor is a mechanical or touch-activated switch, such as a push button switch or capacitive touch switch, located on the chanter. The piper may actuate the push button or capacitive touch switch with the piper's thumb without removing his or her hand from the chanter. The push button switch may be a momentary or a latching switch. The momentary switch requires the piper to maintain pressure on the switch to continue operating the compressor. For the latching mechanical or touch-activated switch, the piper will press or touch the switch once to turn on the motor and compressor and a second time to turn off the motor and compressor. Any other electrical switching technology may be used to activate or deactivate the compressor, including touchless sensors. One or more wires may communicate the switching instruction from the switch to the compressor. Alternatively, the switch may use a wireless connection to the compressor, as by a radio signal. The Invention may use two or more switches simultaneously; for example, the system may utilize both a breath-operated switch in the mouthpiece and a push button or touch-operated switch on the chanter.

In one embodiment that has proven suitable in practice, the motor and compressor are of variable speed and under the control of an electronic speed controller. A compressor having a variable speed motor allows the piper to closely control the pressure and volume of the air produced by the compressor. The motor speed is controlled by a variable speed actuator that may be a rotary actuator operable by the user. A latching puff switch and the air supply line from the compressor both are attached to an air supply line connector. The air supply line connector is configured to attach to the prior art blowpipe stock of the prior art bag. The air supply line connector seals the blowpipe stock and supplies air from the compressor through the air supply line to the interior of the bag. The puff switch combined with a mouthpiece extends from the air supply line connector so that the player may hold the mouthpiece in his or her mouth with the bagpipe in the playing position. The combination of the mouthpiece and puff switch resembles a prior art blowpipe so that during play the player appears to be filling the bag with his or her breath through a prior art blowpipe. In this embodiment, the puff switch may be connected to the compressor motor by a wireless connection, such as a radio transmitter operably attached to the puff switch and a radio receiver operably attached to the motor. Alternatively, the puff switch may be operably attached to the compressor by a wired connection, with the wires running along the air supply line. The apparatus may include a one-way valve, such as a flap valve, to prevent back-flow from the bag towards the compressor and to reduce flutter and harmonics from the compressor interfering with the chanter and drones. This embodiment is light in weight at about 4.5 lbs for the battery, compressor, housing electronic motor speed controller, radio receiver, air supply line, air supply line connector, puff switch, mouthpiece, and connectors. The compressor and its associated battery, case and connectors are readily supported by a shoulder strap, backpack straps, or by the belt of the player.

Alternatively, the compressor may have a fixed, non-variable speed motor. For a compressor having a non-variable speed motor, the compressor may deliver air at a pressure in excess of that required to start and sound the chanter and drones. The air supply system for a non-variable speed compressor may include a user-adjustable pressure relief valve, an air bleed valve or an air pressure regulator to control the air pressure delivered to or within the bag. The piper may manually control the pressure relief valve, air bleed valve or air pressure regulator to reduce the pressure delivered by the compressor and the pressure within the bag to a pressure suitable for play. The pressure relief valve or air bleed valve operates by selectably venting excess pressure to the atmosphere and is located so that the piper may easily adjust the pressure relief valve or air bleed valve during play. An air pressure regulator stops the flow of air into the bag when the pressure within the bag reaches a predetermined maximum pressure, which may be adjustable by the player. The air pressure regulator may be used in conjunction with an air pressure relief valve or air bleed valve upstream of the air pressure regulator. The system and apparatus of the Invention may utilize any combination of pressure relief valve, air bleed valve and air pressure regulator, or may dispense with the pressure relief valve, air bleed valve and air pressure regulator altogether. The air pressure relief valve, air bleed valve or air pressure regulator may be located along the air supply line, within the compressor housing or within the air supply line connector connecting the air supply line to the bag.

Play of the Great Highland Bagpipe with the air supply of the Invention is different from the play of a prior art bagpipe. In a prior art mouth-blown bagpipe, the piper controls the air pressure delivered to the chanter and drones by a combination of the piper's breath and squeezing of the bag between the piper's arm and body. While playing a bagpipe using the adaptive air supply of the Invention, the piper does not squeeze the bag and the bag does not control the air pressure delivered to the reeds. Instead, the bag acts as a plenum and receiving tank for air from the compressor and serves the important function of dampening pressure fluctuations from the compressor before those fluctuations reach the reeds.

The adaptive air supply apparatus may also be used for tuning and setup of the chanter and drones of a bagpipe for any piper, regardless of the physical condition of the piper. To use the adaptive air supply to tune and setup a bagpipe, a user will connect the air supply line connector to the blowpipe stock for a mouth-blown bagpipe or to the corresponding bellows stock for a bellows-blown bagpipe. The user will seal all but one of the chanter and drones, preventing airflow through all but the selected chanter or drone. The user will activate the compressor motor so that the unsealed chanter or drone sounds. The user will then adjust the selected chanter or drone to achieve the desired state of tune and playability. Once satisfied, the user will select another chanter or drone for adjustment and seal the other chanter and drones, will activate the compressor motor to sound the selected chanter or drone, and will adjust the second selected chanter or drone. The user will repeat the process until the chanter and all drones are adjusted.

To assist in tuning and setup, and to assist in use of the adaptive air supply as a teaching tool, the adaptive air supply may include a manometer or other air pressure gauge on the high pressure side of the compressor. The air pressure gauge may be mechanical or electronic. The air supply line connector may include a sealable port for selectable attachment of an air pressure gauge.

III. BRIEF SUMMARY OF THE DRAWINGS

IV. DESCRIPTION OF AN EMBODIMENT

The Invention is an adaptive air supply 2 for any bagpipe, including a Great Highland Bagpipe 4.

Figure 1:
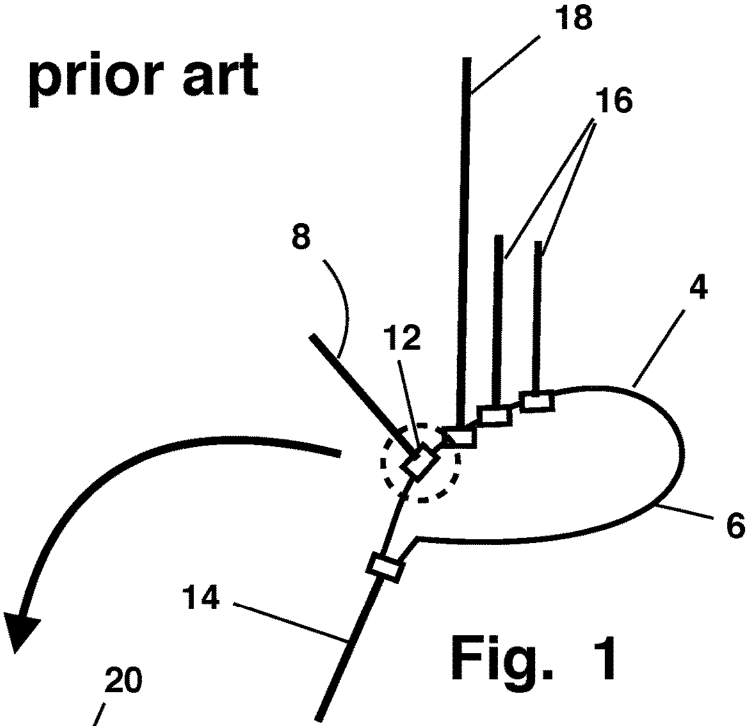
FIG. 1 is schematic side view of a prior art Great Highland Bagpipe.
Figure 2:
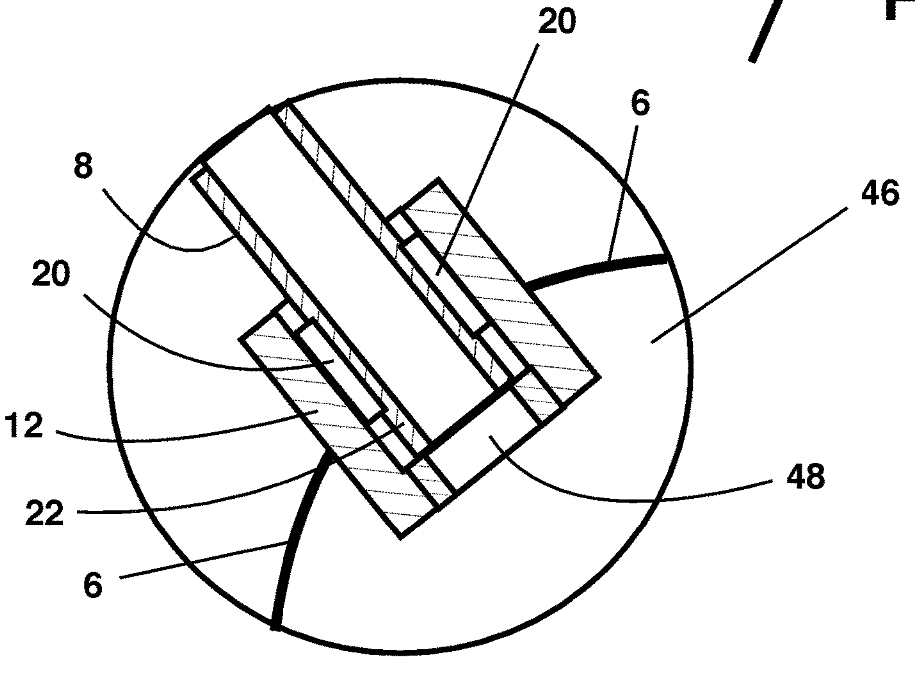
FIG. 2 is a detail of FIG. 1 of the blowpipe stock and blowpipe.

FIGS. 1 and 2 illustrate a prior art Great Highland Bagpipe 4. From FIG. 1, the Great Highland Bagpipe 4 features a bag 6. The bag 6 holds air 10 blown through a blowpipe 8 and through the blowpipe stock 12 into the bag 6 by the breath of a piper. The blowpipe stock 12 is attached to the bag 6 and attaches the blowpipe 8 to the bag 6. The piper squeezes the bag 6 between the piper's arm and body to control the pressure of air 10 within the bag 6 and to force the air 10 through the chanter 14 and through the tenor drones 16 and bass drone 18. Air 10 passing from the bag 6 through the chanter 14 and drones 16, 18 causes reeds to vibrate, generating sound.

FIG. 2 is a detail of FIG. 1 and a section view of the blowpipe 8 and the blowpipe stock 12. Hemp cord 20 wrapped about the blowpipe tenon 22 pneumatically seals the blowpipe tenon 22 to the blowpipe stock 12 so that the piper's breath, manually propelled through the blowpipe 8 by the piper, enters the bag 6 through a blowpipe perforation 48.

FIGS. 3 through 13 illustrate the adaptive air supply 2 of the Invention.

Figure 3:
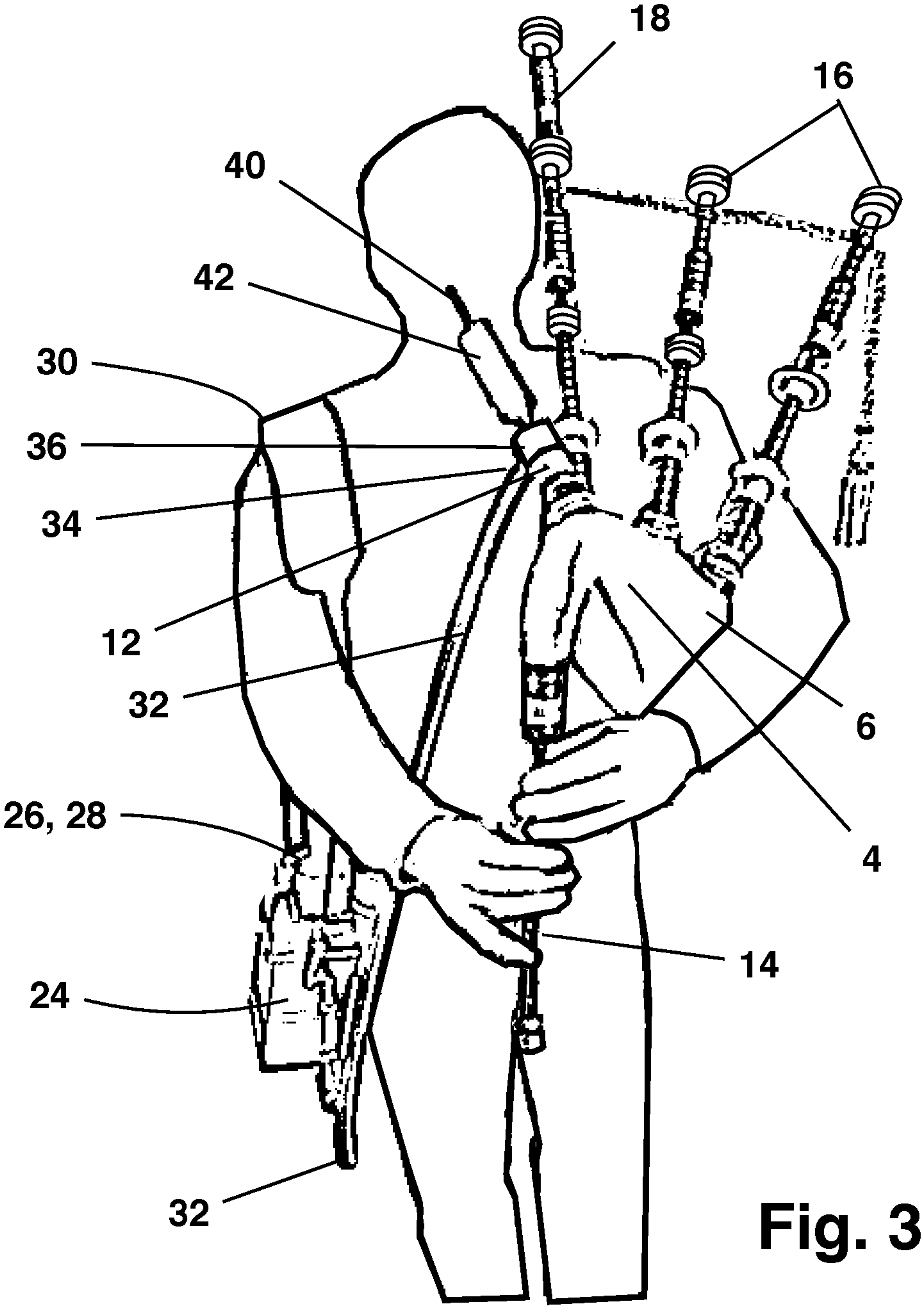
FIG. 3 is an illustration of a piper playing a Great Highland Bagpipe with the adaptive air supply of the Invention.

FIG. 3 shows a piper playing a Great Highland Bagpipe 4 with the adaptive air supply 2. Like a prior art Great Highland Bagpipe 4, the piper holds the bag 6 between the piper's arm and body with the drones 16, 18 over the piper's shoulder. Like a prior art Great Highland Bagpipe 4, the piper holds the chanter 14 in his or her hands and manipulates the chanter 14 to change the pitch of the bagpipe 4. The compressor 24 and power supply 26 together may form a single assembly and the piper may wear the assembled compressor 24 and electrical power supply 26 on the piper's body, as by a strap 30, belt, or backpack. The power supply 26 may be an electrical battery 28 and a 12v lithium ion battery 28 has proven suitable in practice. Alternatively, the power supply 26 may be line current, as from a wall socket. The compressor 24 provides compressed air 10 to the bag 6 through an air supply line 32. The air supply line 32 may join the bag 6 at any location on the bag 6, but connection to the blowpipe stock 12 has proven suitable in practice. The air supply line 32 has a first end 34 that includes an air supply line connector 36. The air supply line connector 36 is configured to engage the blowpipe stock 12 in the same manner as a blowpipe 8; namely, the air supply line connector 36 may include a connector tenon 38 that may be wrapped in hemp cord 20 or may be otherwise pneumatically and selectably sealed to the blowpipe stock 12.

FIGS. 3 through 8 show control options for the air compressor 24. The piper must be able to start and stop the air compressor 24 while the piper is marching, as in a parade, or is moving about, as on a stage. FIGS. 3 through 8 shows a latching, mouth-operated puff switch 42 in pneumatic communication with the mouthpiece 40. As used in this document and the claims the term 'puff switch' includes a puff switch, a sip switch, a bite switch, and a combination puff and sip switch. Puff switches 42 are commonly used to control mobility apparatus and electronic devices by persons who have lost the use of their limbs. The piper will hold the mouthpiece 40 in the piper's mouth, providing for a common appearance with other pipers. When the time comes to activate the air compressor 24, the piper will puff air 10 into the mouthpiece 40 or will sip air 10 from the mouthpiece 40, or will bite the mouthpiece 40, activating the puff switch 42. The puff switch 42 is operably connected to the air compressor 24, starting the air compressor 24. When the piper is ready to stop the air compressor 24, the piper will again puff or sip air 10 to or from the mouthpiece 40 or will bite the mouthpiece 40, activating the puff switch 42 and shutting off the air compressor 24.

In the example of FIGS. 3 through 8, a puff switch 42 is attached to and supported by the supply line connector 36, as more fully described below. A mouthpiece 40 may extend from the puff switch 42 and may be elongated so that the combination of the mouthpiece 40 and the puff switch 42 resembles a prior art blowpipe 8. If the puff switch 42 is a latching switch, the puff switch 42 will stay in the selected activation state until the piper again puffs (or sips or bites)

the mouthpiece 40 to again actuate the switch 42. The mouthpiece 40 is not in fluid communication with the air supply line connector 36 or the bag 6. To an observer, the mouthpiece 40 and puff switch 42 appear to be a blowpipe 8 and the piper appears to be filling the bag 6 with his or her breath. In fact, the compressor 24 is performing that task.

Figure 4:
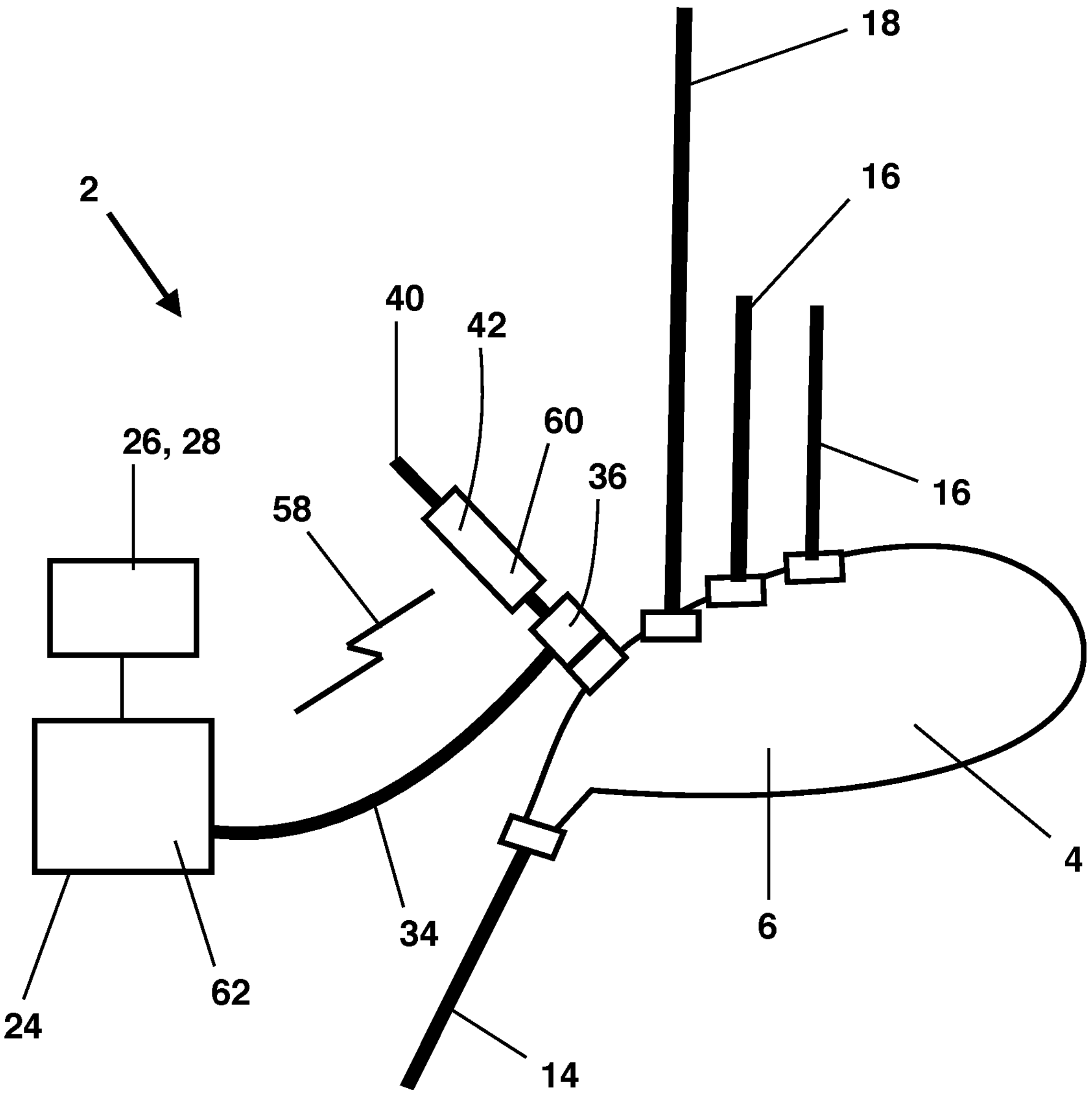
FIG. 4 is a schematic diagram of a first embodiment of the adaptive air supply of the Invention.

The schematic representation of FIG. 4 shows a Great Highland Bagpipe 4 attached to the adaptive air supply 2. The adaptive air supply 2 comprises an electrical power supply 26, which may be a battery 28 such as a lithium ion battery, operably connected to an air compressor 24. The air compressor 24 is configured to deliver air 10 at a pressure of less than 2 psi and at a suitable volumetric flow to sound the chanter 14 and drones 16, 18. The puff switch 42 features a radio transmitter 60 and has a wireless connection 58 to a radio receiver 62. The radio receiver 62 is operably connected to the compressor 24 to start and stop the air compressor 24. The air compressor is controlled by an electronic motor controller to be of variable speed. The piper may select the speed of the compressor 24, and hence the pressure and volume of air 10, by manually adjusting a rotary speed actuator, as shown by FIG. 6.

In practice, an air compressor comprising a 16 kpa air pressure and vacuum air blower 12/24v with double aluminum impeller provided by Ningbo Fenghua Wei Cheng Motor Factory, Zhejiang, China coupled with a model WM 7060 24v, 200 W 3 phase bloc motor controller with a 120 degree hall effect sensor for a dc air blower also from Ningbo Fenghua Wei Cheng Motor Factory, has proven suitable. A latching puff switch, model TDIP air switch to PCB SPN0 from Pool Hot Tub Parts, 1360 BluesHills Ave. ext, Bloomfield, CT 06002 has proven suitable in practice. An eMylo Remote Control Switch model R121a from eMylo Factory C-401, YongChuang Industrial Part, Taoxia, Gaofeng Subdistrict, Longhua New District, Shenzhen, Guangdong, PRC 518109 also has proven suitable in practice. As a power supply, a Milwaukee Tools 12v, 6 ah drill battery model M12 has proven suitable in practice.

Figure 5:
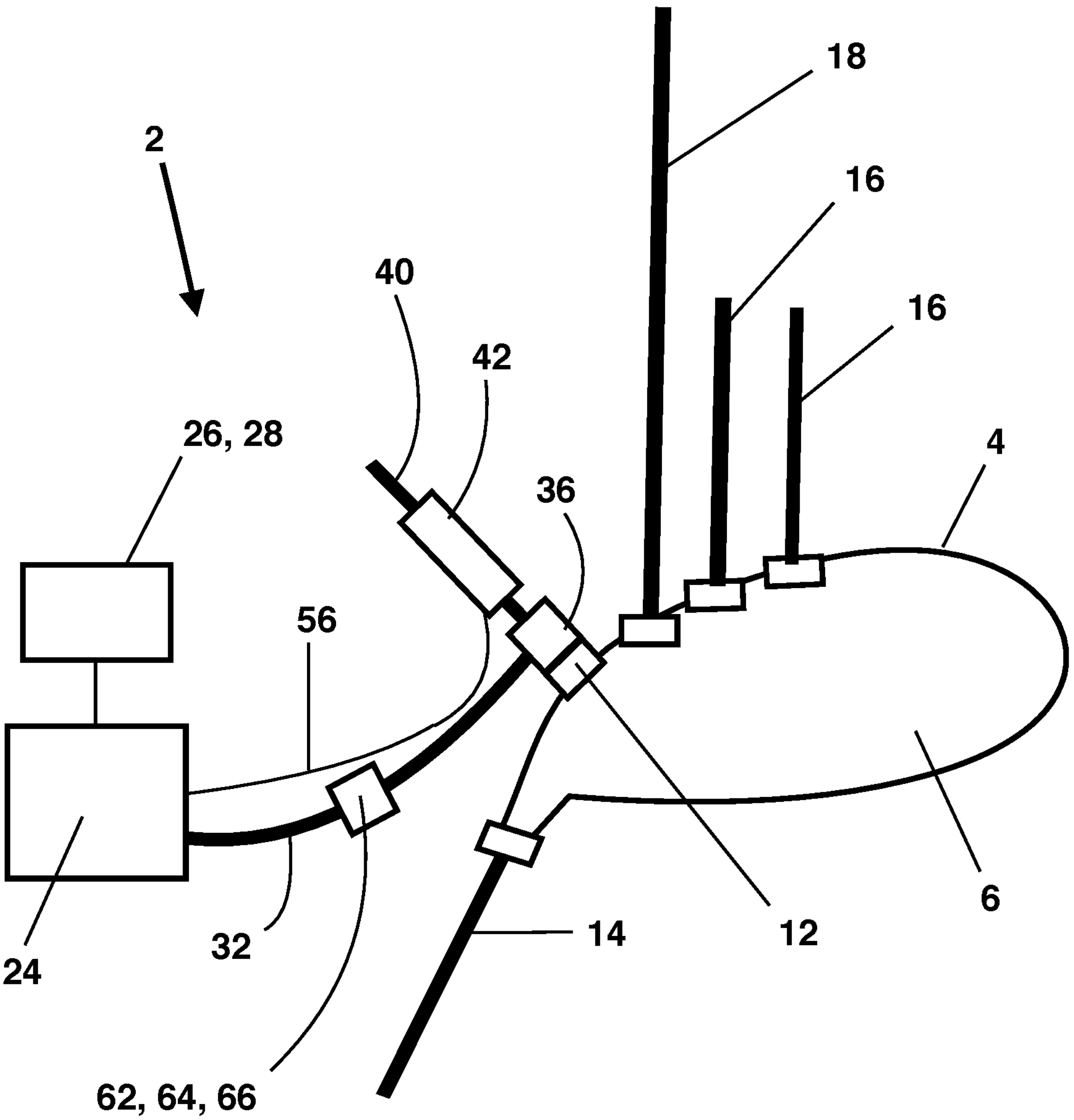
FIG. 5 is a schematic diagram of a second embodiment of the adaptive air supply.

FIG. 5 is a schematic views of a bagpipe 4 equipped with a second embodiment of the adaptive air supply 2. In the embodiment of FIG. 5, the connection between the puff switch 42 and the air compressor 24 is a wired connection 56, dispensing with the radio transmitter 60 and receiver 62. The air compressor of FIG. 5 is single speed, and features a pressure relief valve 62, air bleed valve 64 or pressure regulator 66, all as discussed below, to control the pressure reaching the bag 6 and supplied to the chanter 14 and drones 16, 18.

Figure 6:
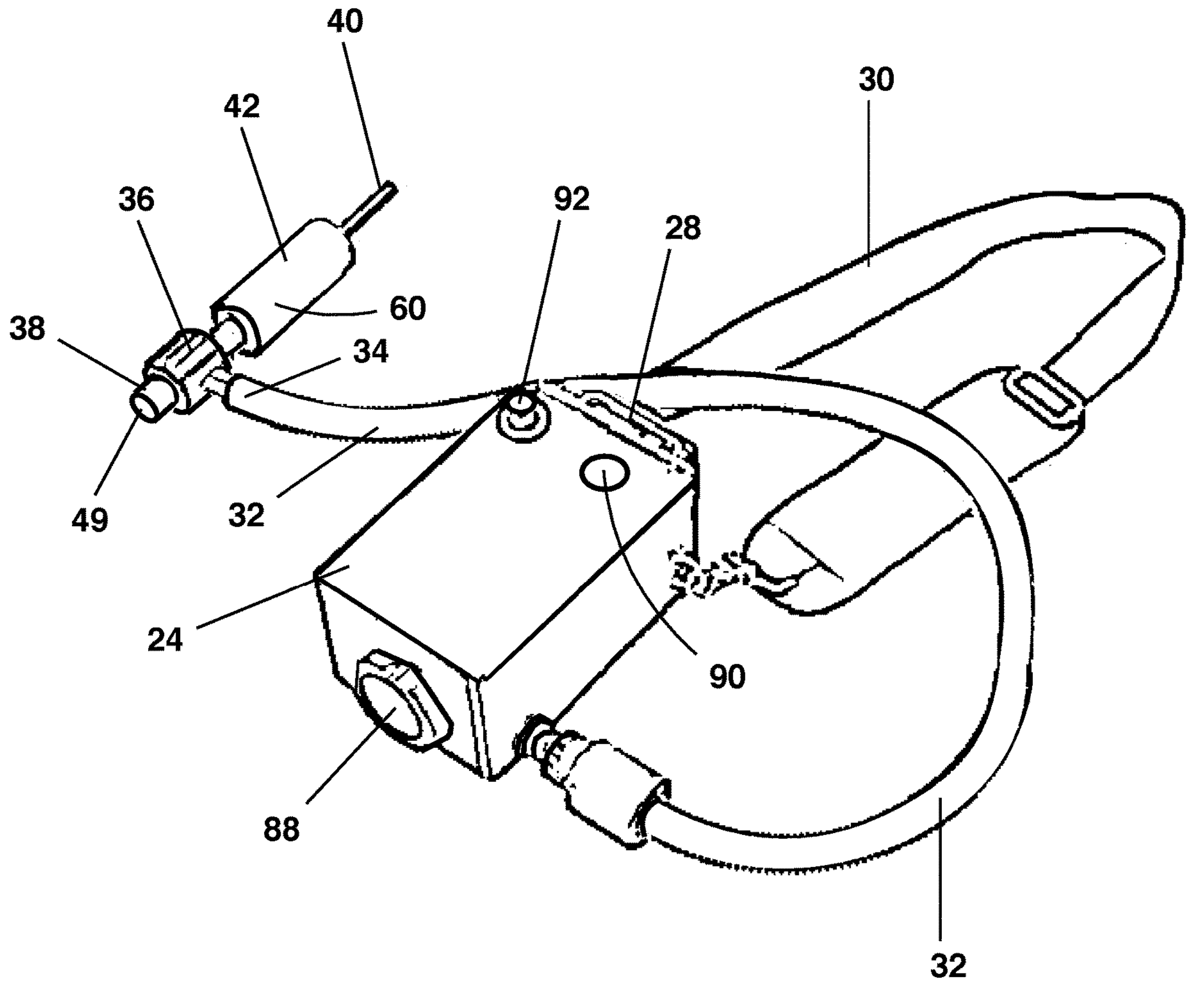
FIG. 6 is a perspective view of the adaptive air supply separated from the bagpipe.

FIG. 6 is a perspective view of the adaptive air supply 2 separated from a bagpipe 4. The adaptive air supply 2 of FIG. 6 is the same as that of FIGS. 3 and 4. The air compressor 24 is of variable speed under the control of an electronic motor controller. The piper may select the speed of the variable speed compressor 34 by manipulating a variable speed actuator 92, such as a rotary actuator. An on/off button 90 turns the entire system on and off. When the compressor 24 is activated, air 10 is pulled through an air intake 88 and impelled through the air supply line 32 to the air supply line connector 36 at the first end 34 of the air supply line 32. The mouthpiece 40 and the puff switch 42 are attached to the air supply line connector 36. The air supply line connector 36 pneumatically connects the air supply line 32 through the connector tenon 38 and past the one-way valve 49 to the blowpipe stock 12.

Figure 7:
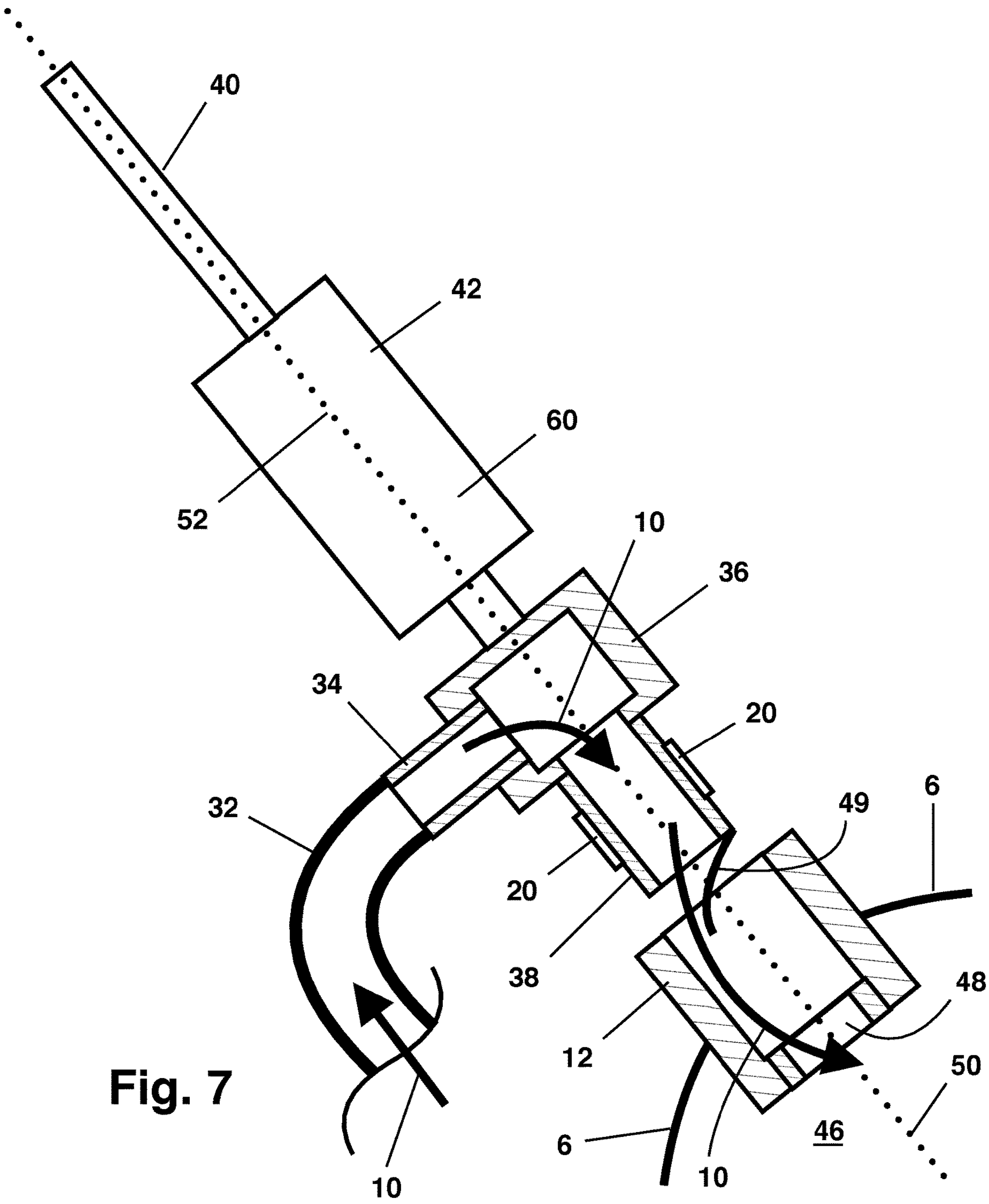
FIG. 7 is a detail exploded section view of a blowpipe stock, air supply line connector, air supply line, puff switch and mouthpiece.

FIG. 7 is an exploded section view of an example of the air supply line connector 36 and attachment of the air supply line 32 to the bag 6. From FIG. 7, the first end 34 of the air supply line 32 is attached to an air supply line connector 36. The air supply line connector 36 has a connector tenon 38 that is configured to sealably connect to the blowpipe stock 12 and to allow air 10 to enter the interior volume 46 of the bag 6 through the blowpipe stock perforation 48. In the example of FIG. 7, hemp cord 20 is wrapped about the connector tenon 38 for a sealable connection to the blowpipe stock 12.

From FIG. 7, the air supply line 32 may connect to the bag 6 through a one-way valve 49. The one-way valve 49 prevents back flow from the bag 6 to the air compressor 24 and also smooths the air 10 flow and reduces flutter and harmonics from the air compressor 24 at the chanter 14 and drones 16, 18.

Figure 8:
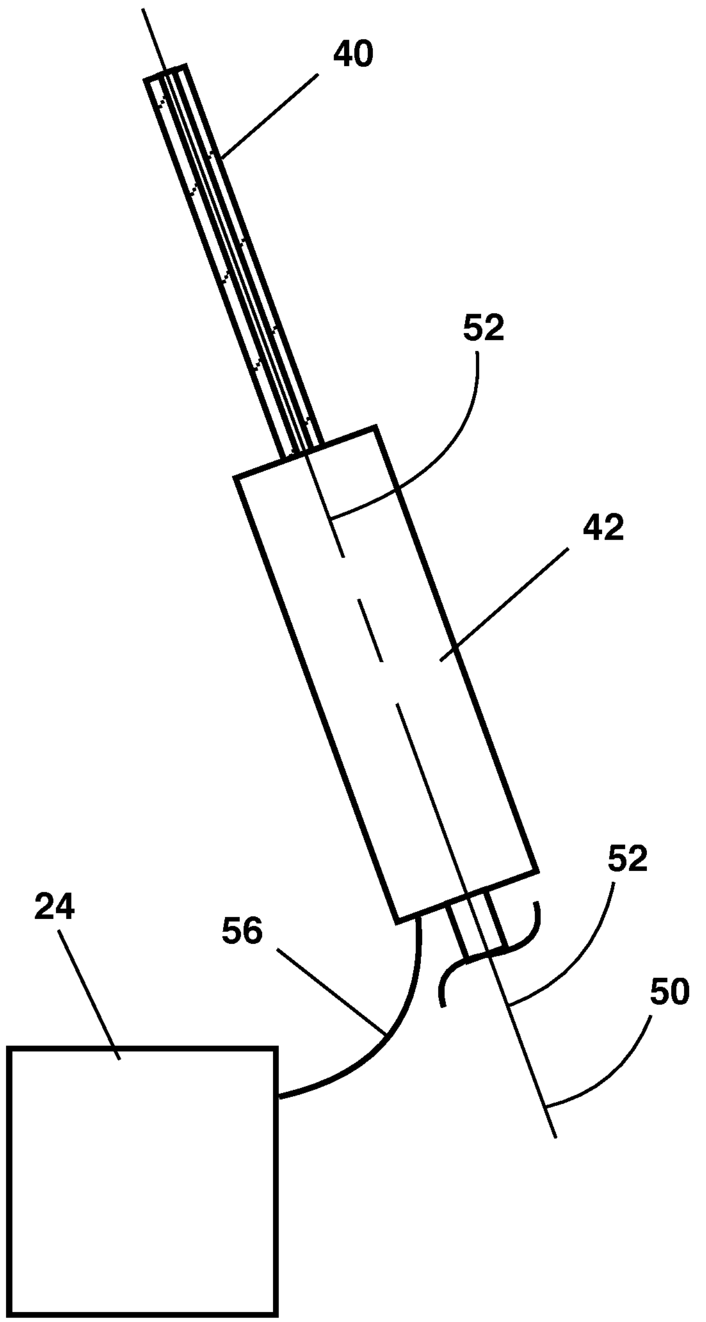
FIG. 8 is a schematic view of the puff switch, mouthpiece, and compressor using a wired connection.

As shown by FIGS. 7 and 8, the blowpipe stock 12 has a blowpipe stock longitudinal axis 50 and the mouthpiece 40 is elongated and has a mouthpiece longitudinal axis 52 (both indicated by a dotted line on FIG. 7). The blowpipe stock longitudinal axis 50 and the mouthpiece longitudinal axis 52 may be parallel and may be coextensive. The resulting alignment of the mouthpiece 40 and the blowpipe stock 12 causes the Great Highland Bagpipe 4 equipped with the adaptive air supply 2 to further resemble a prior art Great Highland Bagpipe 4 with a blowpipe 8.

FIG. 8 is a detail of the embodiment of FIG. 5 with a wired connection 58 between the puff switch 42 and the compressor 24. The embodiment of FIGS. 8 and 5 dispenses with the radio transmitter 60 and receiver 62 of the embodiment of FIGS. 4, 6, and 7.

Figure 9:
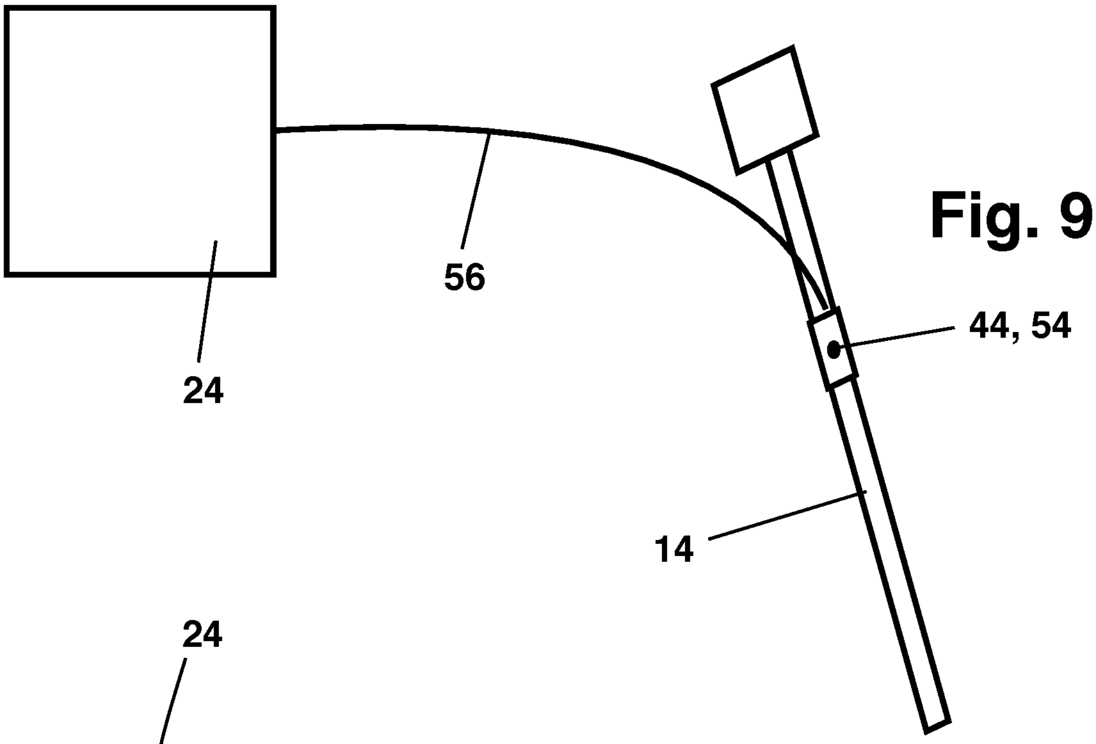
FIG. 9 is a schematic diagram of a button switch attached to a chanter with a wired connection.
Figure 10:
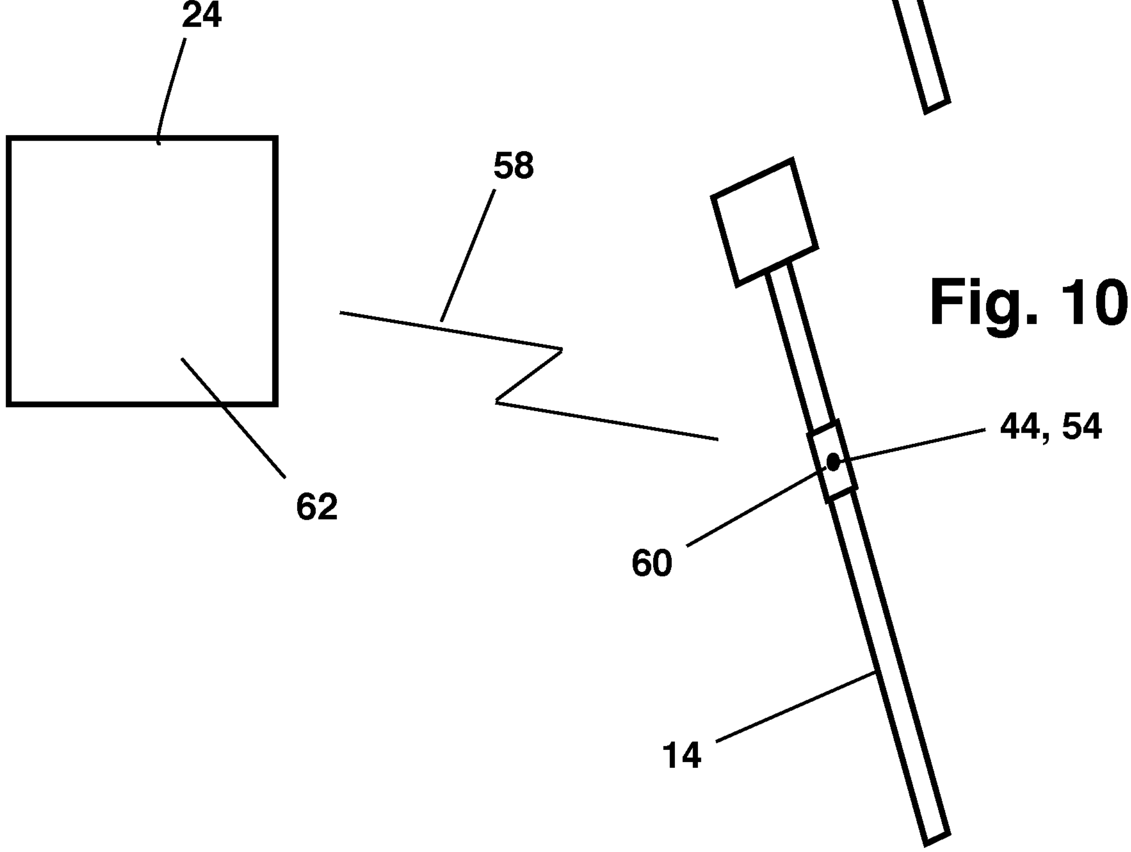
FIG. 10 is a schematic diagram of an embodiment in which the button switch is attached to the chanter and with a wireless connection.

FIGS. 9 and 10 illustrate control over the air compressor 24 by a manual switch 44 that is a mechanical or a touch-sensitive switch 54 attached to the chanter 14 rather than a mouth-operated puff switch 42. A manual switch 44 that uses any switch technology may serve to start and stop the compressor 24. The switch 44 may be a mechanical switch or may utilize any other suitable switching technology, such as a capacitive switch or membrane switch. The manual switch 44 may be an instantaneous switch or may be a latching switch. An example of a mechanical switch 54 is a push-button switch. An example of a touch-sensitive switch 54 is a capacitive switch. FIG. 9 shows the mechanical or touch-sensitive switch 54 mounted to the chanter 14 where the piper can actuate the mechanical or touch-sensitive switch 54 with the piper's digits and with a wired connection 56 to the air compressor 24. To start the air compressor 24, the piper will press or touch the switch 54, causing the air compressor 24 to start. When it is time to stop the air compressor 24, the piper will again press or touch the switch 54. If the switch 54 is an instantaneous switch, the piper will continuously press or touch the instantaneous switch to keep the compressor 24 running. As soon as the piper releases the instantaneous switch, the compressor 24 will stop running.

FIG. 10 shows that the operable connection between the manual switch 44 and the air compressor 24 may be a wireless connection 58. The mechanical or touch-sensitive switch 54 is operably connected to a radio transmitter 60. The air compressor 24 has a corresponding radio receiver 62. The radio receiver 62 receives the radio signal transmitted by the radio transmitter 60, starting or stopping the air compressor 24 as commanded by the piper. While FIG. 10 shows the wireless connection 58 in the case of a switch 54 located on the chanter 14, the wireless connection 58 applies equally to a mouth-operated puff switch 42.

Figure 11:
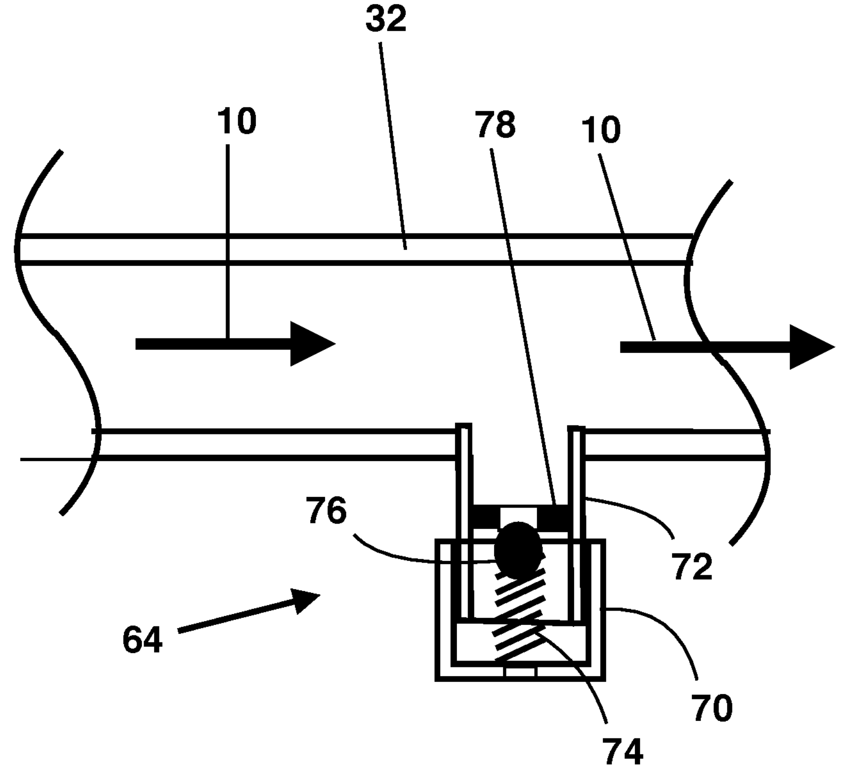
FIG. 11 is a section view of a thumbscrew-operated pressure relief valve.
Figure 12:
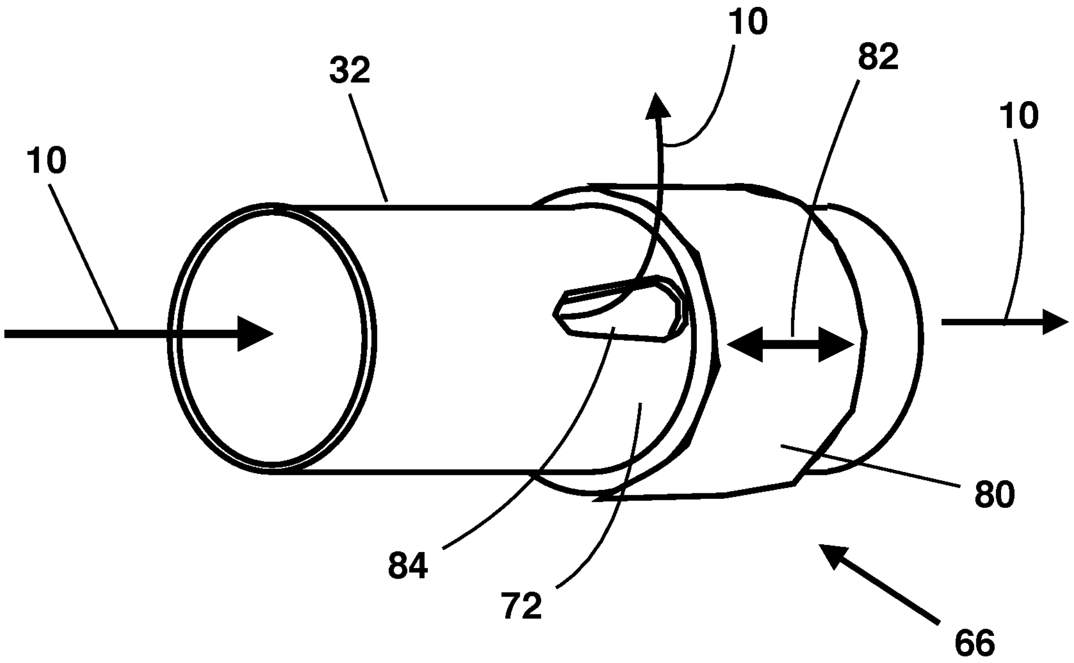
FIG. 12 is a perspective view of a sliding air bleed valve.
Figure 13:
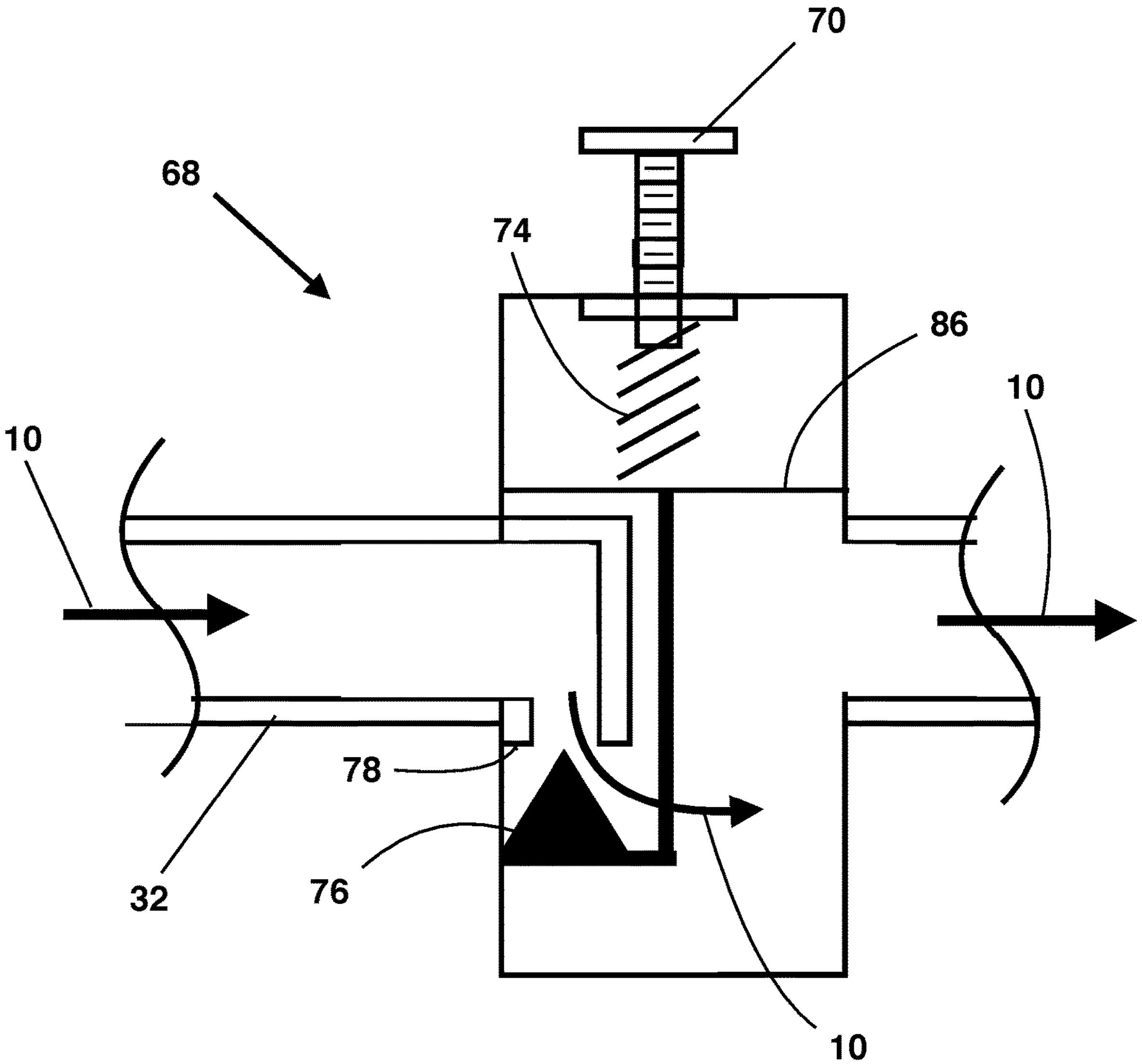
FIG. 13 is a section view of a pressure regulator.

From FIGS. 11 through 13, the adaptive air supply 2 may include features to regulate the air 10 pressure reaching the bag 6, which may be particularly useful where the compressor 24 is a single speed compressor 24. The features may include any combination of a pressure relief valve 64, an air bleed valve 66 and a pressure regulator 68.

FIG. 11 illustrates an example pressure relief valve 64. The pressure relief valve 64 is located on the high pressure side of the compressor 24 between the compressor 24 and the bag 6. The pressure relief valve 64 may be located within the case of the compressor 24 and may be located within the air supply line 32. The pressure relief valve 64 controls the air 10 pressure on the high pressure side of the compressor 24 and hence the air 10 pressure delivered to the bag 6.

The example pressure relief valve of FIG. 11 is operated by a thumb screw 70. The thumbscrew 70 is in threaded engagement with a valve body 72. The threaded thumbscrew 70 bears on a preload spring 74 that presses a valve 76 against a valve seat 78 to determine the preload on the spring 74. When the air 10 pressure within the air supply line 32 exceeds a predetermined relief pressure and overcomes the preload on the valve 76 by the spring 74, the valve 76 is pushed away from the valve seat 78, opening the pressure relief valve 64 and allowing air 10 to escape from the air supply line 32.

FIG. 12 shows an example air bleed valve 66 in the form of a sliding sleeve 80. The sliding sleeve 80 is slideable on the valve body 72 in the axial direction 82. In the example of FIG. 10, the valve body 72 is defined by the air supply line 32. The sliding sleeve 80 may occlude or open an orifice 84 in the valve body 72, selectably allowing air 10 to escape from the air supply line 32. The orifice 84 may be tapered, as shown by FIG. 10, to allow fine adjustment of the air 10 pressure within the air supply line 32.

FIG. 13 shows a pressure regulator 68 used instead of or in conjunction with a pressure relief valve 64 or air bleed valve 66. The pressure regulator 68 has a diaphragm 86 exposed to the air 10 pressure on the downstream side of the valve 76. The diaphragm 86 moves in response to the air 10 pressure against a spring 74 that is pre-loaded by a thumb screw 70. When the air 10 pressure acting against the diaphragm 86 reaches a predetermined cutoff pressure and overcomes the preload of the spring 74, the diaphragm 86 moves a valve 76 against the seat 78, preventing further air 10 flowing past the pressure regulator 68 and into the bag 6.

The pressure regulator 68 shown by FIG. 13 does not include a pressure relief valve 64 or air bleed valve 66, but a pressure relief valve 64 or air bleed valve 66 may be incorporated into the pressure regulator 68 or may be added to the pressure regulator 68. Use of the pressure regulator 68 allows the air compressor 24 to maintain the air supply line 32 at a higher air 10 pressure than the bag 6 and allows less than continuous operation by the air compressor 24.

Any element referred to by the same number in different drawings or different paragraphs of this specification is the same or equivalent element and has the same or equivalent meaning when the element number is included in another drawing or in another paragraph of this specification, unless the context requires otherwise.

The following is a list of numbered elements in the specification and on the drawings.

Adaptive air supply 2
Great Highland Bagpipe 4
Bag 6
Blowpipe 8
Air 10
Blowpipe stock 12
Chanter 14
Tenor drones 16
Bass drone 18
Hemp cord 20
Blowpipe tenon 22
Air compressor 24
Electrical power supply 26
Battery 28
Strap 30
Air supply line 32
First end 34
Air supply line connector 36
Connector tenon 38
Mouthpiece 40
Puff switch, a bite switch, a sip switch, or a sip and puff switch 42
Manual switch 44
Bag interior volume 46
Blowpipe stock perforation 48
One-way valve 49
Blowpipe stock longitudinal axis 50
Mouthpiece longitudinal axis 52
Mechanical or touch-sensitive switch 54
Wired connection 56
Wireless connection 58
Radio transmitter 60
Radio receiver 62
Pressure relief valve 64
A bleed valve 66
A pressure regulator 68
Thumb screw 70
Valve body 72
Preload spring 74
Valve 76
Valve seat 78
Sliding sleeve 80
Axial direction 82
Orifice 84
Diaphragm 86
Air intake 88
On/off switch 90
Variable speed actuator 92

I claim:

1. An adaptive air supply apparatus for a bagpipe, the apparatus comprising:

a. an air compressor, the air compressor being electrically powered, the bagpipe having a bag and a chanter in fluid communication with the bag, the bag having an outside, an inside and a bag interior volume, the air compressor being configured to selectably propel air into the bag interior volume, the bag having a blowpipe stock including a perforation communicating through the blowpipe stock from the outside to the inside of the bag;

b. a manual switch, the manual switch being operably connected to the air compressor to start and to stop the air compressor, wherein the manual switch is a mouth-operated switch that is a bite switch, a puff switch, a sip switch, or a sip and puff switch, wherein a mouthpiece is attached to the mouth-operated switch and configured to be held in the mouth of a player, the mouthpiece being elongated, whereby the mouthpiece resembles a blowpipe;

c. an air supply line, the air supply line being operably attached to the air compressor and configured to receive air from the air compressor, the air supply line having a first end, an air supply line connector being disposed at the first end, the air supply line connector being configured for selectable attachment to the blowpipe stock and to convey air through the blowpipe stock and into the bag interior volume, wherein the mouth-operated switch and mouthpiece are attached to the air supply line connector and are attachable to and detachable from the blowpipe stock with the air supply line connector.

2. The adaptive air supply apparatus of claim 1, the apparatus further comprising:

a. a compressor motor configured to power the compressor, the motor and the compressor having a variable speed;

b. a motor speed controller operably attached to the compressor motor, the motor speed being controllable by the piper using the motor speed controller whereby the motor speed and hence the pressure and volume of air delivered by the compressor is controllable by the piper.

3. The adaptive air supply apparatus of claim 1 wherein the blowpipe stock is annularly disposed about a blowpipe stock longitudinal axis, the mouthpiece having a mouthpiece longitudinal axis, the mouthpiece longitudinal axis being parallel to or coextensive with the blowpipe stock longitudinal axis when the air supply line connector is attached to the blowpipe stock.

4. The adaptive air supply apparatus of claim 1 wherein the mouth-operated switch is a latching switch.

5. The adaptive air supply apparatus of claim 1 wherein the operable connection of the manual switch is a wireless connection.

6. The adaptive air supply apparatus of claim 1, the apparatus further comprising:

a bleed valve, a pressure relief valve, or an air pressure regulator, the bleed valve being configured to selectably release air continuously and adjustably from the compressor, the air supply line or the bag when the compressor is operating, the pressure relief valve being configured to allow the escape of air from the compressor or the air supply line or the bag when the air pressure at the pressure relief valve reaches a predetermined relief pressure, the air pressure regulator being operably attached to the air compressor and configured to block the air flow from the air compressor to the bag interior volume when the air pressure within the bag interior volume reaches a predetermined cutoff pressure.

7. The adaptive air supply apparatus of claim 1 further comprising: a one-way valve, the one-way valve being configured to reduce or prevent the flow of air from the bag through the perforation when the air pressure within the bag interior volume exceeds the air pressure within the air supply line.

8. A method of playing a bagpipe, the method comprising:

a. obtaining a bagpipe, the bagpipe having a bag, the bag having an outside, an inside and an interior volume, the bagpipe having a chanter in selectable fluid communication with the interior volume of the bag;

b. obtaining an air compressor, the air compressor being electrically powered, the air compressor having a manual switch operably attached to the air compressor, wherein the manual switch is a mouth-operated switch selected from the list consisting of a bite switch, a puff switch, a sip switch, and a puff and sip switch;

c. placing the air compressor in fluid communication with the interior volume of the bag;

d. energizing the air compressor using the manual switch;

e. manipulating the chanter to play the bagpipe, wherein the bag has a blowpipe stock, the blowpipe stock including a perforation communicating through the blowpipe stock from the outside to the inside of the bag, the step of placing the air compressor in fluid communication with the interior volume of the bag comprising obtaining an air supply line in selectable fluid communication with the air compressor, the air supply line having a first end and an air supply line connector disposed at the first end, the air supply line connector being configured for selectable attachment to the blowpipe stock and to convey air through the blowpipe stock into the bag interior volume, wherein a mouthpiece is attached to the mouth-operated switch and configured to be held in the mouth of a player, the mouthpiece being elongated, the mouthpiece and the mouth-operated switch are attached to the air supply line connector and are attachable to and detachable from the blowpipe stock with the air supply line connector, wherein the blowpipe stock is annularly disposed about a blowpipe stock longitudinal axis, the elongated mouthpiece having a mouthpiece longitudinal axis, the mouthpiece longitudinal axis being parallel to or coextensive with the blowpipe stock longitudinal axis when the air supply line connector is attached to the blowpipe stock.

9. A bagpipe apparatus having an adaptive air supply, the apparatus comprising:

a. a bag, having an inside, an outside and an interior volume, the bag having a chanter in fluid communication with the interior volume;

b. an air compressor, the air compressor being electrically powered, the air compressor being configured to selectably propel air into the bag interior volume;

c. a manual switch, the manual switch being operably connected to the air compressor, the manual switch being configured to start and to stop the air compressor, wherein the manual switch is a mouth-operated switch selected from the list consisting of a bite switch, a puff switch, a sip switch, and a puff and sip switch and wherein the bag has a blowpipe stock, the blowpipe stock including a perforation communicating through the blowpipe stock from the outside to the inside of the bag;

d. an air supply line in fluid communication with the air compressor, the air supply line having a first end and an air supply line connector disposed at the first end, the air supply line connector being configured for selectable attachment to the blowpipe stock and to convey air through the blowpipe stock and into the bag interior volume when air supply line connector is attached to the blowpipe stock wherein a mouthpiece is attached to the mouth-operated switch and configured to be held in the mouth of a player, the mouthpiece being elongated, the mouthpiece and the mouth-operated switch are attached to the air supply line connector and are attachable to and detachable from the blowpipe stock with the air supply line connector, wherein the blowpipe stock is annularly disposed about a blowpipe stock longitudinal axis, the elongated mouthpiece having a mouthpiece longitudinal axis, the mouthpiece longitudinal axis being parallel to or coextensive with the blowpipe stock longitudinal axis when the air supply line connector is attached to the blowpipe stock.

* * * * *